US005463375A

United States Patent [19]

Bauer

[11] Patent Number: 5,463,375

[45] Date of Patent: Oct. 31, 1995

[54] STATUS-REPORTING DEVICE FOR REPORTING A PREDETERMINED TEMPERATURE STATE, TEMPERATURE SENSOR SUITABLE FOR SUCH A STATUS-REPORTING DEVICE, AND PROCESS FOR THE PRODUCTION OF SUCH A TEMPERATURE SENSOR

[75] Inventor: Heinz Bauer, Edertal, Germany

[73] Assignee: Dylec Ltd., Guernsey, United Kingdom

[21] Appl. No.: 962,789

[22] PCT Filed: Jun. 19, 1991

[86] PCT No.: PCT/DE91/00507

§ 371 Date: Dec. 21, 1992

§ 102(e) Date: Dec. 21, 1992

[87] PCT Pub. No.: WO91/20065

PCT Pub. Date: Dec. 26, 1991

[30] Foreign Application Priority Data

Jun. 19, 1990 [DE] Germany .......................... 40 19 542.2

[51] Int. Cl.$^{6}$ ...................................................... G01K 1/00

[52] U.S. Cl. .......................... 340/517; 340/584; 374/158; 374/208

[58] Field of Search .................................... 340/584, 517, 340/577, 870.17; 374/158, 194, 208, 209, 210

[56] References Cited

U.S. PATENT DOCUMENTS

| | | | |
|---|---|---|---|
| 3,987,899 | 10/1976 | Vyprachticky | 374/209 |
| 4,223,302 | 9/1980 | Hocking | 340/517 |
| 4,340,886 | 7/1982 | Boldt et al. | 340/517 |
| 4,485,263 | 11/1984 | Itoyama et al. | 374/208 |
| 4,929,093 | 5/1990 | Suzuki et al. | 374/208 |

FOREIGN PATENT DOCUMENTS

| | | |
|---|---|---|
| 0004911 | 10/1979 | European Pat. Off. . |
| 260127 | 9/1988 | German Dem. Rep. . |
| 3128811 | 2/1983 | Germany . |
| 1204604 | 9/1970 | United Kingdom . |
| 2174525 | 11/1986 | United Kingdom . |
| 2209086 | 4/1989 | United Kingdom . |
| 8806868 | 9/1988 | WIPO . |

OTHER PUBLICATIONS

Electronics Weekly, No. 778, 13 Aug. 1975 (London GB) "Technical Review 2; Product News: Keeping High Standards in system components" p. 22.

Electronic Design, Band 33, No. 1, 10 Jan. 1985, Hasbrouck Heights, N.J., L. Sherman: "Primed by a Processor . . . " pp. 289–296.

Patent abstracts of Japan: Band 9, No. 68 (P–344) [1791] 28 Mar. 1985 & JP, A, 59202038 (TDK K.K.) 15 Nov. 1984.

*Primary Examiner*—John K. Peng
*Assistant Examiner*—Daniel J. Wu
*Attorney, Agent, or Firm*—Michael J. Striker

[57] ABSTRACT

The invention is directed to a status-reporting device with a plurality of sensors which send output signals whose values depend on the status monitored by the sensors and with an evaluating device which is connected to the sensors and responds by sending an alarm signal when a preselected value of the output signals is reached. According to the invention, the evaluating device has an individual threshold switch ($IC_{51}$) which generates the alarm signal and is connected with the output (3) of an interrogating device ($IC_3$) which has a plurality of inputs (1, 2, 5, 12–15) connected to each sensor, respectively, and means ($IC_2$) which connect the inputs (1, 2, 5, 12–15) with the output (3) periodically and one after the other. Also described is a temperature sensor which is particularly suitable for fire detection and fire extinguishing systems, as well as a process for the production thereof (FIG. 4).

24 Claims, 6 Drawing Sheets

STATUS-REPORTING DEVICE FOR REPORTING A PREDETERMINED TEMPERATURE STATE, TEMPERATURE SENSOR SUITABLE FOR SUCH A STATUS-REPORTING DEVICE, AND PROCESS FOR THE PRODUCTION OF SUCH A TEMPERATURE SENSOR

BACKGROUND OF THE INVENTION

The invention is directed to a status-reporting device, a temperature sensor suitable for this purpose, and a process for the production of such a temperature sensor.

Known status-reporting devices of the type indicated above serve to send an alarm signal when an extreme temperature state occurs and simultaneously to indicate which one of the temperature sensors in question triggered the alarm signal (U.S. Pat. No. 4,340,886, EP-A-0 004 911, GB-A-2 174 525, Electronics Weekly No. 778, Aug. 13, 1975, Electronic Design, volume 13, No. 1, Jan. 10, 1985, DE-A-31 28 811). The temperature is monitored e.g. for the purpose of reporting a fire or for monitoring the temperature e.g. of engines, warehouses, furnaces or refrigerating installations. Utilized temperature sensors include thermal members, resistor temperature gauges, temperature-sensitive diodes, mercury switches or the like, as well as e.g. conventional fire alarms or broken-glass detectors, all of which are characterized by relatively slow response times, low sensitivities and large dimensions.

SUMMARY OF THE INVENTION

According to one object of the invention, the status-reporting device designated in the beginning is to be made suitable not only for monitoring temperature, but also for automatically triggering an extinguishing installation as is desired and required e.g. in aircraft, tanks, hazardous material tank trucks or the like because of fires which often erupt in an explosive manner. Therefore, for such applications, not only must temperature sensors be provided which are very small and therefore have very fast responses and can be sampled at high frequencies, but also a process by which such temperature sensors can be produced with such high mechanical and thermal stability that they can also be used in highly sensitive fire detection and fire extinguishing systems in moving vehicles without the risk of mechanical or thermal damage. The invention therefore has the object of proposing a temperature sensor which is particularly suitable for such a status-reporting device and a process for its production.

According to the invention the status-reporting device for reporting a predetermined temperature state comprises a plurality of temperature sensors producing output signals according to a temperature state monitored by the sensors and an evaluating device connected to the sensors and having means for generating and transmitting an alarm signal when a preselected value of the output signals is reached. The evaluating device comprises an interrogating device having an output and a plurality of inputs connected to respective temperature sensors, means for connecting the inputs of the interrogating device with the output of the interrogating device periodically and one after the other and a threshold switch having an output, and means for generating the alarm signal connected to the output of the interrogating device. In this status-reporting device each of the temperature sensors is a bead-heat conductor provided with a tip carrying a semiconductor bead and arranged in a housing. The housing has a hollow end portion and a protective cap connected to the hollow end portion so that the tip is arranged within the cap and the cap is provided with at least one opening for maintaining a flow of air around the tip. The bead-heat conductor in the housing is embedded in a casting compound so that only the tip projects out of the casting compound.

The invention also includes the temperature sensor having the above-described structure.

In a preferred embodiment of the status-reporting device according to the invention the evaluating device further comprises a monoflop for temporarily storing the alarm signal and the output of the threshold switch is connected with the monoflop.

According to the invention the process for making the above-described temperature sensor includes the steps of:

a) providing the housing of the sensor including the protective cap;

b) assembling the sensor element with leads and plug-in connectors in the housing;

c) preheating the hollow end portion of the housing and the protective cap to about 80° C.;

d) filling the hollow end portion and at least a part of the protective cap with a mixture of a sealing compound and a hardener in a mixture weight ratio of said sealing compound to said hardener of 10:1 to 10:1.1 so as to form the casting compound, said filling continuing until only the tip of the bead conductor carrying the heat conductor bead projects out of the casting compound;

e) heating the filled hollow end portion and the filled part of the protective cap of step d) at about 80° C. for about 16 hours, then heating at about 120° C. for about 3 hours and finally heating at about 180° C. for about 3 hours so as to cure the casting compound; and f) allowing the filled hollow end portion and the filled part of the protective cap heated in step e) to cool to room temperature so as to form the temperature sensor.

The invention provides the advantage that it enables a practical application of heat conductors and accordingly makes use of their advantages, known per se, such as small dimensions, quick response times and high sensitivity. Moreover, temperature sensors are suggested which enable a measurement of the temperature of the surrounding air but can also be kept very small at the same time and can nevertheless be effectively protected against mechanical damage and are therefore particularly suitable for use in confined spaces. Finally, the process according to the invention makes it possible to manufacture such temperature sensors in such a way that the casting compound does not liquify on the one hand even at measured temperatures of e.g. 300°–900° C., but on the other hand is also not so hard that the decisive sensor part, i.e. the heat conductor bead, cracks and so becomes useless as a result of internal stresses in manufacture or use. Finally, since the heat conductor bead in the temperature sensor according to the invention remains directly exposed to the air in spite of its mechanical protection, the entire temperature reporting device has high reaction speeds with the result that critical excesses in temperature, fires or the like are reported after fractions of seconds rather than only after a delay.

As a result of the advantages and capacity of the novel sensor described above and also in view of the considerable cost advantages, there also exist additional possibilities for the application of the status-reporting device according to the invention in overheating or fire detection systems such as in home installations, for the detection of tire overheating in trucks, in power plants or in ships as well as in automatic extinguishing systems in public and private buildings.

Apart from the alarm function, the status-reporting device can also be used as part of a regulating system. Accordingly, in connection with electronics, additional possibilities of application are provided such as in the area of air conditioning technology or heat regulation.

BRIEF DESCRIPTION OF THE DRAWINGS

The invention is shown in more detail in the following in connection with the attached drawings with reference to the specific embodiment example of a fire detection system.

DESCRIPTION OF THE PREFERRED EMBODIMENTS

Figure 1:
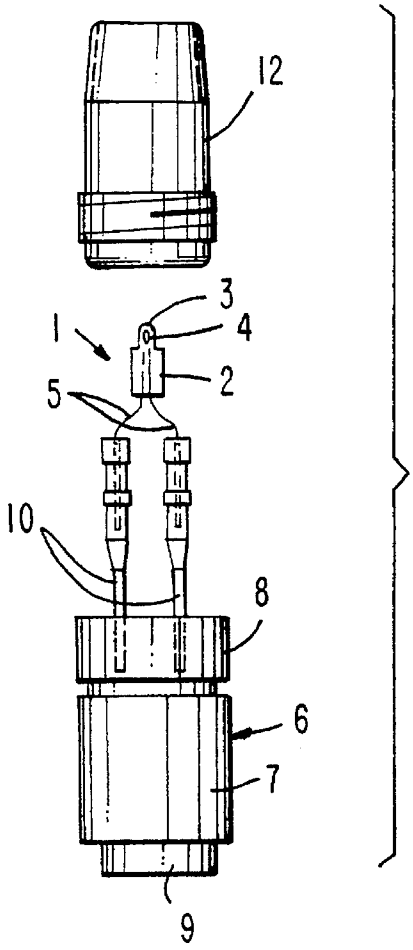
FIG. 1 shows a temperature sensor according to the invention in a scale of approximately 1:1 as viewed from the front in the disassembled state.
Figure 1A:
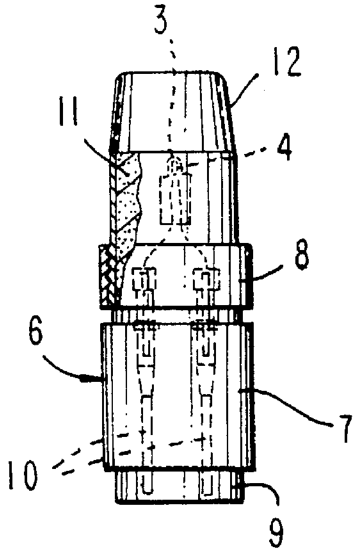
FIG. 1*a* shows the temperature sensor according to FIG. 1 in the assembled state and in partial section as viewed from the front.

FIG. 1 shows a temperature sensor according to the invention with a heat conductor 1 in the form of a bead heat conductor (e.g. M 812 by Siemens AG, D-8000 Munich 80) having a heat conductor bead or semiconductor pellet 4 enclosed in a thin, short glass tube 2 and arranged at its tip 3. Two leads 5 which are guided out of the glass tube 2 are fastened to this heat conductor bead or semiconductor pellet 4. In order to use such a commercially available heat conductor 1 for the purposes of the invention it is combined with a preferably cylindrical plug-in connector housing 6 which has an intermediate part 7, a hollow end portion 8 arranged at one side, and a base 9 arranged at its other side and constructed as a conventional 2- or 3-pin plug. The leads 5 are guided into the hollow-cylindrical ends of plug-in connectors 10 and securely connected with the plug-in connectors 10 by crimping to prevent a solder or like material from melting and running off when the end portion 8 is subsequently cast. The plug-in connectors 10 are then inserted through bore holes constructed in the insert piece, not shown, which fills the intermediate part 7. This results in the arrangement shown in FIG. 1*a* in which the free ends of the plug-in connectors 10 project into the hollow base 9. In so doing, the plug-in connectors 10 are preferably securely locked in the insert piece by members acting as a snap-in connection. Further, the glass tube 2 is preferably arranged so as to be parallel and coaxial to the axis of the plug-in connector housing 6 and the heat conductor pellet 4 is arranged at the end of the end portion 8 remote of the intermediate part 7.

To obtain a mechanically stable construction for the extremely sensitive bead heat conductor 1 the hollow end portion 8 is filled with a casting compound 11 until the entire glass tube 2, with the exception of its tip 3, is embedded in the casting compound 11. Accordingly, after casting, only the tip 3 with the semiconductor pellet 4 projects out of the plug-in connector housing 6 and casting compound, resulting on the one hand in a mechanically stable sensor and on the other hand in a very sensible and very fast-response temperature gauge which measures the temperature of the surrounding air and reacts progressively faster to changes in temperature in proportion to the reduction in the surface of the semiconductor pellet 4 to be heated. Response times in the order of magnitude of a half second can be achieved when using commercially available heat conductors 1 of the described type, which is particularly important for rapid detection and extinguishing of fires. Another advantage of such heat conductors 1 consists in that the desired triggering temperature can be fixed to approximately ±1° C. within the range of 80° C. and 300° C. by circuits which will be described in the following with reference to FIG. 4.

To protect the tip 3 of the heat conductor 1 against mechanical damage, e.g. when assembling the plug-in connector housing 6 at the place of use, a preferably cylindrical protective cap 12 can be screwed onto the end portion of the plug-in connector housing 6 in addition. This protective cap 12 is either open at the outer end and/or provided with a plurality of openings so that the air whose temperature is to be monitored can flow around the tip 3 and accordingly also around the semiconductor pellet 4. In this case the heat conductor pellet 4 is arranged at a preselected location within the protective cap 12 and the protective cap is filled with the casting compound 11 to a height h such that only the tip 3 with the semiconductor pellet 4 projects out of the casting compound 11. After casting, the protective cap 12 forms an inseparable unit with the plug-in connector housing 6.

The greatest caution must be exercised when introducing the casting compound 11 into the end portion 8. Otherwise the casting compound 11 will either be too soft with the result that it liquifies in the temperature range of e.g. 80° C. to 300° C. to be monitored, thereby impairing the mechanical stability of the sensor, or too hard with the risk that the tip 3 of the glass tube 2 pops off and renders the sensor unusable.

Casting compounds which are produced from heat-curing epoxy resins and have a high thermal conductivity and a thermal expansion coefficient comparable to copper can be used. A two-component epoxy casting resin sold by the firm Grace Electronic Materials Emerson & Cuming (D-6900 Heidelberg) under the name "Stycast 2762 FT" (sealing compound) and "Catalyst 17" (hardener) has proven particularly suitable. When this casting resin is used the end portion 8 must be filled in the following manner:

The sensor is first produced in the described manner. A casting compound is then produced by mixing together the sealing compound and the hardener in a mixture ratio (weight ratio) of 10:1 to 10:1.1. The end portion 8 which is preferably preheated to approximately 80° C. is then filled with the casting compound which is preheated in an oven to 80° C. The subsequent curing is effected in the oven in three heating stages, first at 80° C. for 16 hours, then at 120° C. for 3 hours, and finally once more at 180° C. for 3 hours. The oven is then reset to 80° C. and switched off when this temperature has been reached. After the oven cools to room temperature, e.g. 20° C., the operational temperature sensor with the cast-in heat conductor can be removed from the oven. The sensor can be produced from different materials.

The plug-in connector housing is preferably produced from metal and the insert piece from a plastic which is not electrically conductive and has the required resistance to the temperatures which may possibly be reached. The required insulation is ensured simultaneously by using casting compound 11 of a nonconductive material.

The sensor produced according to the process described above can be used anywhere for measuring or monitoring temperatures within a temperature range of approximately −60° C. to 900° C. depending on the type of heat conductor and can function either as a thermometer or a thermostat. An advantageous application is described in the following with reference to a fire detection system with a series of e.g. seven identical temperature sensors arranged in different risk zones.

Figure 2:
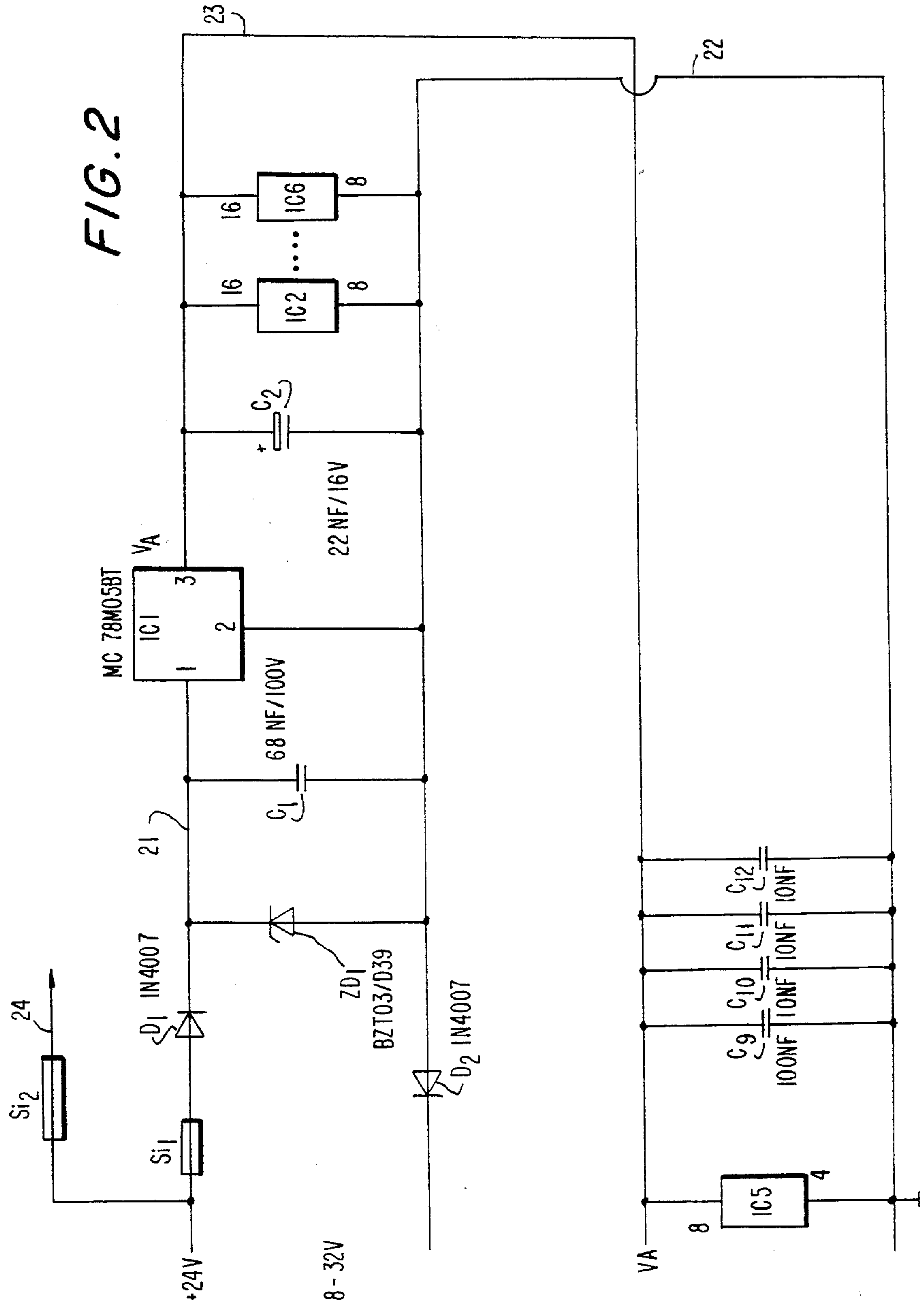
FIG. 2 shows a power unit for the status-reporting device according to the invention.

FIG. 2 shows the circuit of a power unit for use in the circuits shown in the following drawings with a constant voltage $V_A$, e.g. +5 V± 1% corresponding to conventional integrated circuit technology. The input voltage can be selected e.g. between + 8 V and + 32 V, is applied to an input line 21 provided with a fuse $Si_1$, and amounts to + 24 V in the embodiment example. A Zener diode $ZD_1$ (e.g. BZT 03/D39), which limits the input voltage to 39 V irrespective of possible voltage peaks, and a capacitor $C_1$ for smoothing large fluctuations in voltage are connected between the input line 21 and a ground line 22. Two diodes $D_1$ and $D_2$ (e.g. 1N 4007) connected in lines 21 and 22 serve as polarity protection.

The inputs (1 and 2) of a voltage regulator $IC_1$ (e.g. MC 78 M05 BT) are connected with lines 21 and 22, the output (3) of the voltage regulator $IC_1$ being connected with an output line 23 on which there is a constant voltage $V_A$ which is smoothed by an additional filter capacitor $C_2$. Various integrated-circuit modules $IC_2$ to $IC_6$, described in the following, with their inputs 8 and 16 and an integrated-circuit module $IC_5$ with its inputs 4 and 8 are connected between lines 22 and 23. In addition, capacitors $C_8$ (FIG. 3) and $C_9$ to $C_{12}$ are connected in parallel with these inputs corresponding to the respective specification sheets to protect the integrated-circuit modules from smaller stray voltages. These capacitors are only shown in FIGS. 2 and 3.

Figure 4:
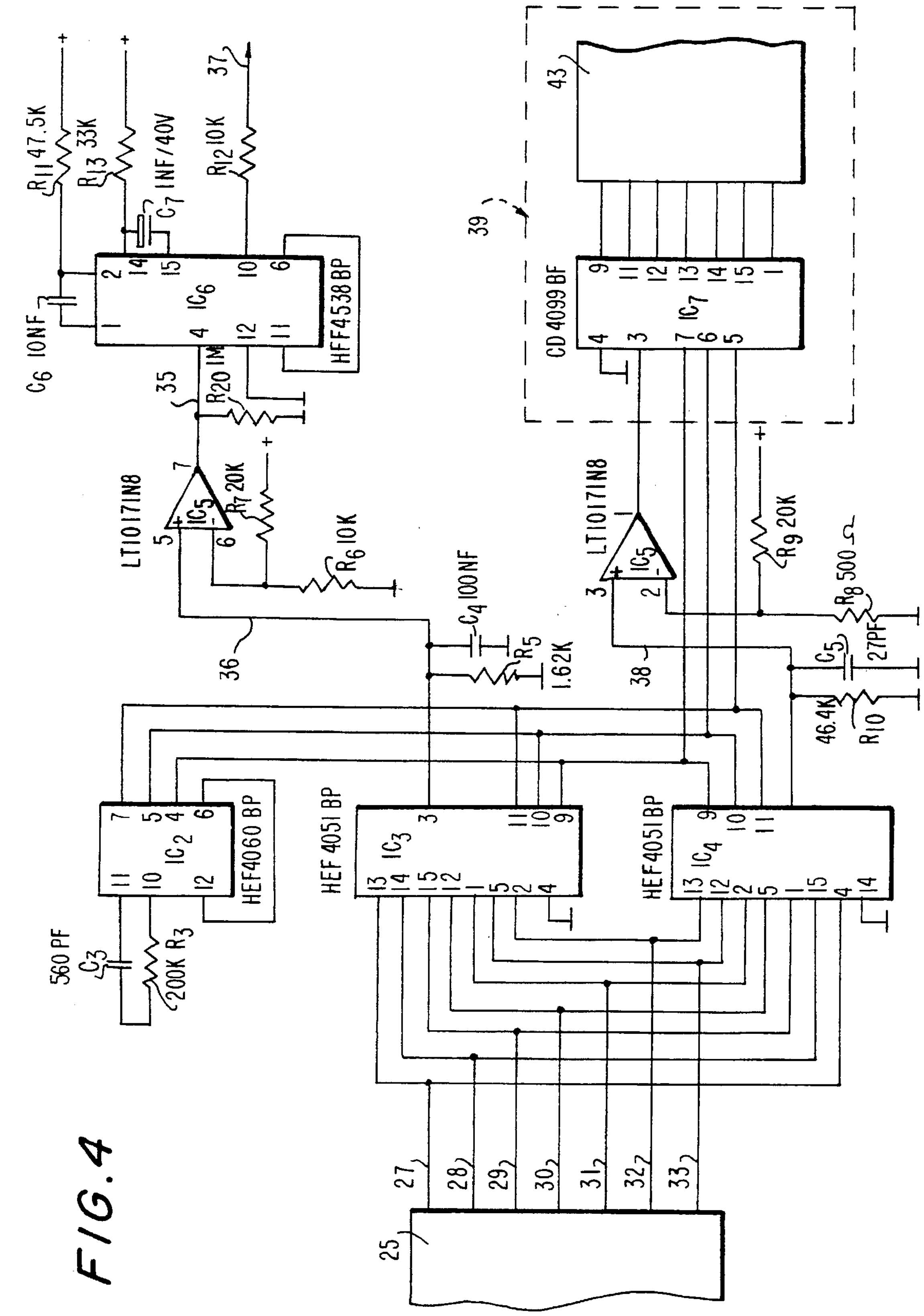
FIG. 4 shows an evaluating device having a threshold switch and a testing device for the status-reporting device which is connected in parallel to the evaluating device.
Figures 5, 6:
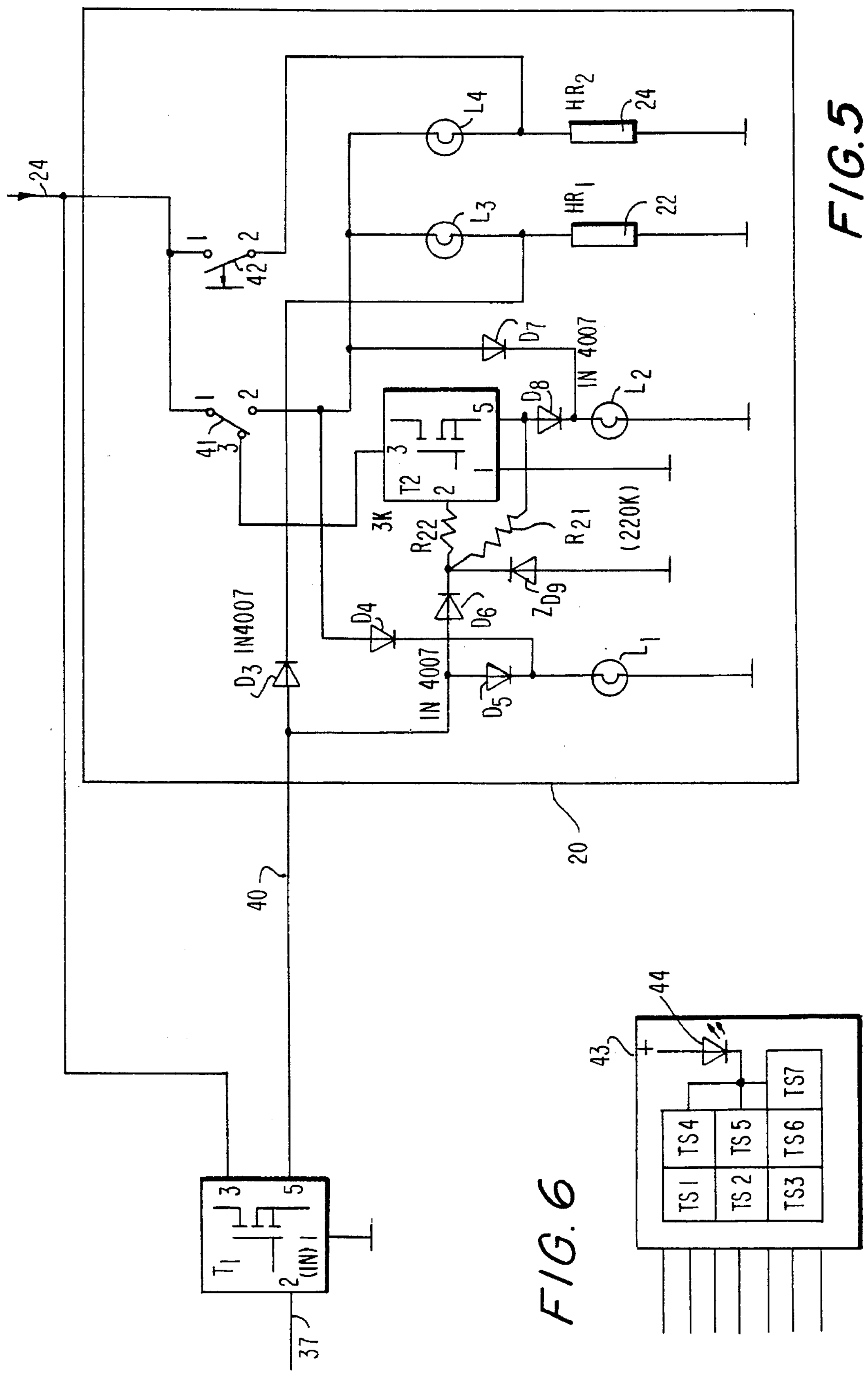
FIG. 5 shows an alarm and/or safety device for the status-reporting device.
FIG. 6 shows part of a display device for the testing device according to FIG. 5.

A line 24 which is connected with the input line 21 and provided with a fuse $Si_2$ leads to an alarm and/or safety device 20 shown in FIG. 5 and to a power switch $T_1$, likewise shown in FIG. 5. On the other hand, integrated-circuit modules $IC_2$ to $IC_6$ and $IC_5$ belong to the evaluating circuit according to FIG. 4.

Figure 3:
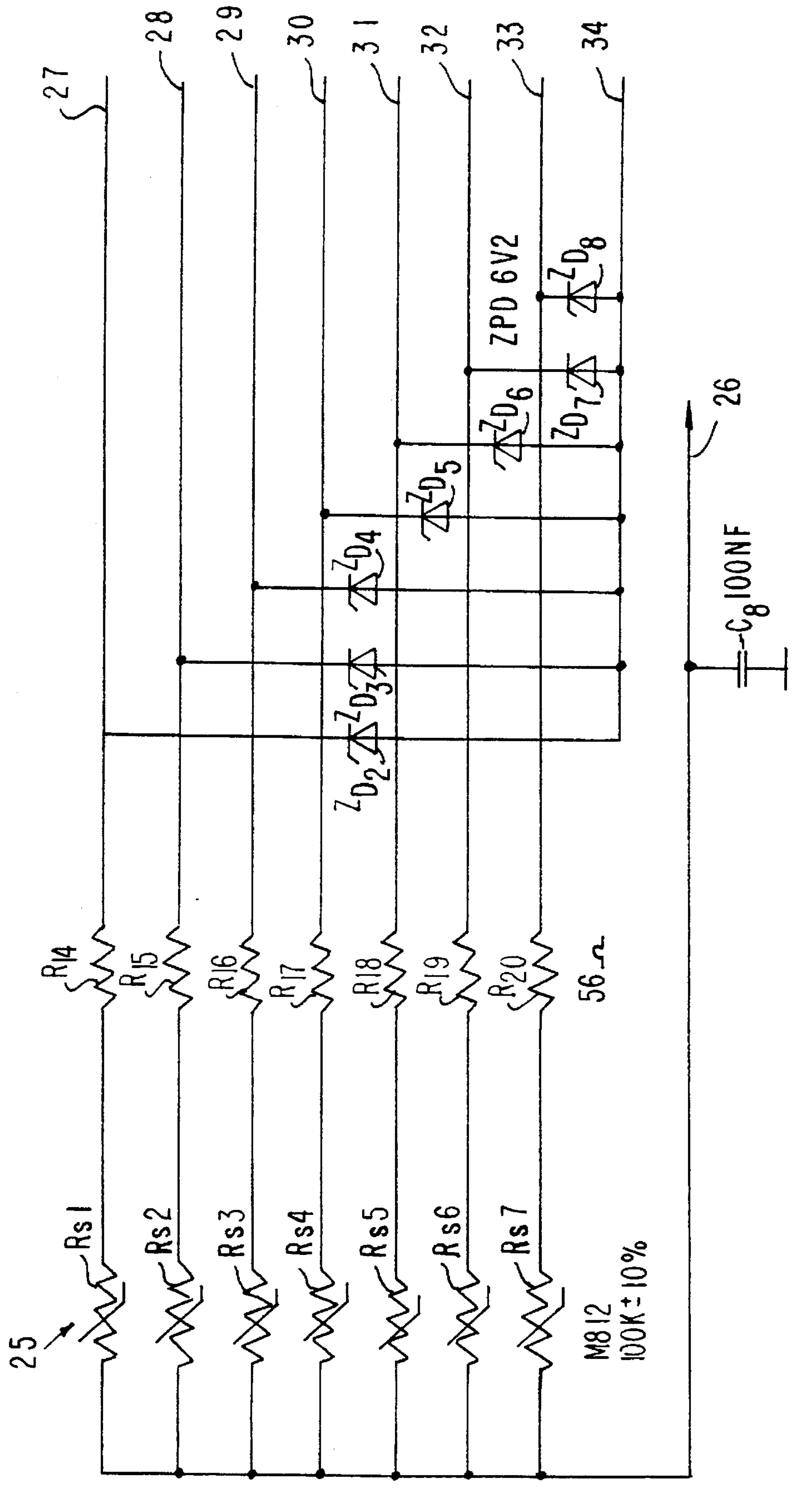
FIG. 3 shows a sensor unit for the status-reporting device.

FIG. 3 shows a transmitter unit 25 containing in this embodiment example seven heat conductor temperature sensors $Rs_1$ to $Rs_7$ (e.g. M 812-100 k± 10%) which are arranged at desired locations to be monitored in an aircraft, truck or the like, are preferably constructed corresponding to FIG. 1 and are sensitive within the range of −55° C. to 350° C. The ohmic resistance of the sensors $Rs_1$ to $Rs_7$ decreases as the temperature increases. Therefore, in the embodiment example the sensors $Rs_1$ to $Rs_7$ include resistors, one of whose connections is connected via a line 26 to the output line 23 of the power unit (FIG. 2). In contrast, the other connections are connected via resistors $R_{14}$ to $R_{20}$ (e.g. 56 Ω) with outputs 27 to 33 which supply output signals whose values depend on the temperatures monitored by the sensors $Rs_1$ to $Rs_7$. A Zener diode $ZD_2$ to $ZD_8$ (e.g. ZPD 6 V 2) is connected between these outputs 27 to 33 and a line 34 connected with the ground line 22 (FIG. 2) to limit the voltages at the outputs of the sensors $Rs_1$ to $Rs_7$ to 6.2 V so as to protect subsequent circuits.

According to FIG. 4, which shows only a schematic view of the transmitter unit 25, the outputs 27 to 33 of the latter are connected with an input of an evaluating circuit which can supply an alarm signal to an output line 35. In the embodiment example this occurs whenever the output signal at one of the outputs 27 to 33 of the transmitter unit 25 exceeds a preselected critical value in the positive or negative direction, as desired.

According to the invention, the evaluating unit according to FIG. 4 contains a single threshold switch $IC_{51}$ in the form of an integrated-circuit module (e.g. LT 1017 IN8) whose output (7) is connected with the line 35. This threshold switch $IC_{51}$ is connected at its inverting input (6) with two variable resistors $R_6$ (e.g. 10 k) and $R_7$ (e.g. 20 k) by means of which a positive voltage can be adjusted as threshold at the inverting input (6). On the other hand, the noninverting input (5) is connected, via a line 36 to which is connected a resistor $R_5$ (e.g. 1.62 k) connected to ground by its other connection, with the output (3) of an interrogating device $IC_3$ in the form of an additional integrated-circuit module (e.g. HEF 4051 BP) having seven inputs (1, 2, 5, 12–15) connected with outputs 27 to 33, respectively, and an input (4) connected to ground. A filter capacitor $C_4$ connected with the line 36 serves to prevent voltage peaks.

The interrogating device $IC_3$ is associated with means by which the aforementioned inputs (1, 2, 5, 12–15) are connected with the output (3) individually one after the other and with periodic recurrence. These means preferably include an oscillator in the form of another integrated-circuit module (e.g. HEF 4060 BP) having three outputs (4, 5, 7) which are connected with three additional inputs (9– 11) of the interrogating device $IC_3$ at which clock signals occur at three different clock frequencies. The latter control the internal clock of the interrogating device $IC_3$ on the one hand and, on the other hand, determine the repetition rate at which the inputs (1, 2, 5, 12–15) are connected with the output (3) individually one after the other and how quickly these interrogating cycles are to be repeated. The oscillator $IC_2$ is provided with external circuits (e.g. $R_3$, $C_3$), according to the specification sheet, in order to adjust this clock frequency.

If at some point e.g. the input (13) of the interrogating device $IC_3$ connected with the line 27 of the transmitter unit 25 is connected with its output (3), the resistor of sensor $Rs_1$ and the resistors $R_{14}$, $R_5$ form a voltage divider. The voltages and resistances are selected in such a way that the voltage occurring at the noninverting input (5) is lower than the voltage occurring at the inverting input (6) of the threshold switch $IC_{51}$ at normal temperatures and is adjusted e.g. to + 25 V. Therefore, an output signal of 0 V is supplied at the output (7) of the threshold switch $IC_{51}$. On the other hand, if the voltage in line 36 increases due to a critical increase in temperature in the region of the sensor $Rs_1$, the drop in voltage in line 36 continues to increase until it finally exceeds the adjusted threshold value and is greater than the voltage at the inverting input (6). The threshold switch $IC_{51}$ then switches through so that the alarm signal (logical "1") which amounts to 5 V, for instance, occurs at its output (7). The setting can be selected in such a way for example that the threshold value is exceeded at a critical temperature of 180° C. or some other temperature.

The same holds true in an analogous manner for the other sensors $Rs_2$ to $Rs_7$ since whenever they are connected with output (3) via the interrogating device $IC_3$, they form a voltage divider together with one of the resistors $R_{15}$ to $R_{20}$ and the resistor $R_5$, which voltage divider influences the input voltage at the noninverting input (5) of the threshold switch $IC_{51}$. Therefore, the alarm signal occurs periodically in the line 35 whenever one of the sensors $Rs_1$ to $Rs_7$ is exposed to a temperature higher than the adjusted threshold value, and this alarm signal persists until the next sensor is connected to the threshold switch $IC_{51}$ by the interrogating device $IC_3$.

According to FIG. 4 the line 35 of the evaluating device $IC_3$ is connected with an input (4) of a monoflop $IC_6$ (e.g. HFF 4538 BP) whose output (10) is connected with the line switch $T_1$ according to FIG. 5 via a dropping resistor $R_{12}$ (e.g. 10 k) and an output line 37 of the evaluating device. The monoflop $IC_6$ is set by the occurrence of each alarm signal at its output (10) for a preselected period of time which can be adjusted by an external circuit at additional inputs (1, 2, 14, 15) according to the specification sheet. This ensures that a signal of sufficient length to control the alarm and/or safety device 20 is formed in the output line 37 itself at a preferably very high interrogation frequency. Moreover, the line 35 is grounded via a high resistance $R_{20}$ (e.g. 1M). This ensures that the monoflop $IC_6$ is set to zero at the output (10) during an extreme disturbance, e.g. a voltage drop due to a disconnected battery terminal, and does not unintentionally send an output signal signalling an alarm state.

A testing device which checks the proper functioning of the interrogating device $IC_3$, particularly sensors $Rs_1$ to $Rs_7$, and sends another alarm signal in the event of improper functioning is associated with the interrogating device $IC_3$. This testing device contains an additional interrogating device $IC_4$ (e.g. HEF 4051 BP) corresponding to the interrogating device $IC_3$ and another threshold switch $IC_{52}$ (e.g. LT 1017 IN 8) which is connected with its output (3) and is preferably combined with the threshold switch $IC_{51}$ in a common housing having another output (1) and two additional inputs (2, 3) which are associated with the threshold switch $IC_{52}$.

In a manner analogous to the interrogating device $IC_3$, inputs (1, 2, 4, 5, 12, 13, 15) of the interrogating device $IC_4$ are connected with the output lines 27 to 33 of the transmitter unit 25 and additional inputs (9–11) are connected with the outputs of means corresponding to means $IC_2$, preferably with the same oscillator $IC_2$, so that the inputs (1, 2, 4, 5, 12, 13, 15) are connected with the output 3 in a corresponding manner.

In contrast to the interrogating device $IC_3$, the output (3) of the interrogating device $IC_4$ is connected with a line 38 leading to the noninverting input (3) of the threshold switch $IC_{52}$ to which are connected a comparatively large resistor $R_5$ (e.g. 46.4 k) grounded with the other connection and a filter capacitor $C_5$. The voltage normally occurring at the noninverting input (2) of the threshold switch $IC_{52}$ is accordingly adjusted to a greater value than the voltage connected to the inverting input by the resistors $R_8$, $R_9$. As a result the threshold switch $IC_{52}$ sends an output signal of e.g. + 5 V when the sensor unit 25 and interrogating device $IC_3$ are operational, regardless of whether or not the monitored temperature corresponds to the preselected room temperature or to the temperature preselected by the threshold value of the threshold switch $IC_{51}$.

On the other hand, if one of the sensors $Rs_1$ to $Rs_7$ is defective, the voltage at the noninverting input of the threshold switch $IC_{52}$ drops to zero with the result that an alarm signal of 0 V occurs at the output (1) and is fed to a display device 39. The additional alarm signal therefore occurs whenever a defective sensor $Rs_1$ to $Rs_7$ is connected with the output (3) of the additional interrogating device $IC_4$ or when there is another defect, e.g. power outage.

Each alarm signal maintained by the monoflop $IC_6$ for a period of e.g. several seconds at the line 37 switches through the power switch $T_1$, according to FIG. 5 which is constructed e.g. as a field-effect transistor. The 24 V voltage of the power unit (FIG. 2) is connected to the input (3) of the power switch $T_1$ and reaches a control line 40 leading to the alarm and/or safety device 20 by means of the switching process.

In the simplest case, the alarm and/or safety device 20 contains e.g. a warning light $L_1$ which is connected via a diode $D_5$ (e.g. IN 4007) and lights up when an alarm signal occurs as long as the monoflop $IC_6$ is set at the output (10). As an alternative or in addition to the latter, a warning light $L_2$ can be connected to the control line 40 via another corresponding diode $D_6$, a resistor $R_{21}$ (e.g. 220 k) and a third diode $D_8$ (e.g. also IN 4007). A hold circuit is associated with this control line 40. The hold circuit contains a switch $T_2$ constructed as a field-effect transistor whose control input (2) is connected with the output of the diode $D_6$ via a resistor $R_{22}$ (e.g. 3 k) and to ground via a Zener diode $ZD_9$ and whose voltage input (3) is connected to the line 24 coming from the power unit via a hand switch 41. The output (5) of this switch $T_2$ is connected to the warning light $L_2$ on the one hand and is guided back to the control input (2) on the other hand via the resistors $R_{21}$ and $R_{22}$. The warning light $L_2$ therefore lights continuously after the switch $T_2$ is triggered, which has the advantage that a driver who has temporarily left his vehicle which is outfitted with the described status-reporting device can determine upon returning to it whether or not an alarm signal occurred in the interval. The warning light $L_2$ can be extinguished again by briefly actuating the hand switch 41 for opening the hold circuit.

The alarm and/or safety device 20 can have e.g. at least two fire extinguisher bottles $HR_1$ and $HR_2$ which are provided with trigger caps conventionally used in fire protection systems. The voltage input of the fire extinguisher bottle $HR_1$ is connected directly to the control line 40, e.g. via a diode $D_3$ (e.g. 1N 4007), while the voltage input of the fire extinguisher bottle $HR_2$ is connected to the line 24 of the power unit via a switch 42 which is normally open. The fire extinguisher bottle $HR_1$ is therefore automatically triggered when an alarm signal occurs so as to initiate an extinguishing process, while the fire extinguisher bottle $HR_2$ can be actuated manually in addition or by actuating the hand switch 42 when the fire extinguisher bottle $HR_1$ is spent.

Finally, two indicator lights $L_3$ and $L_4$ serve to check the functioning of the alarm and/or safety device 20. The two indicator lights $L_3$ and $L_4$ are connected between the voltage inputs of the fire extinguisher bottles $HR_1$ and $HR_2$ and a second fixed contact of the hand switch 41 and two diodes $D_4$ and $D_7$ which are connected between the second fixed contact of the hand switch 41 and the connection points between the diodes $D_5$ and $D_8$, respectively, and the respective warning lights $L_1$ and $L_2$, respectively. When the hand switch 41 is switched from its normal position shown in FIG. 4 to the second fixed contact the warning lights $L_1$, $L_2$ are therefore connected to the 24 V line 24 and accordingly tested. However, the warning lights $L_3$ and $L_4$ will also light up in this position of the hand switch 41. For this purpose their operating voltages are selected in such a way that, while connected to ground via the firing caps of the fire extinguisher bottles $HR_1$, $HR_2$ when the latter are intact, no automatic self-firing of the fire extinguisher bottles $HR_1$, $HR_2$ is effected via these firing caps. On the other hand, if one of the firing caps is defective the respective warning light cannot be grounded via this firing cap and therefore does not light.

Moreover, the polarity of the diodes $D_3$ to $D_8$ is arranged in such a way that the current can flow only in the directions shown in FIG. 5 and no unwanted feedback can occur on nonparticipating circuit parts.

For the purpose of checking the functioning of the sensors $Rs_1$ to $Rs_7$ the display device 39 is constructed in the following manner: According to FIG. 4, it contains a ground switch $IC_7$ (e.g. CD 4099 BF) whose input (3) is connected with the output (1) of the threshold switch $IC_{52}$, while three additional inputs (5–7) of the ground switch $IC_7$ are connected with the outputs (4, 5, 7) of means which periodically activate the outputs (1, 9, 11–15) of the ground switch $IC_7$ one after the other. These means are advisably formed by the oscillator $IC_2$. Activating the outputs (1, 9, 11–15) causes them to be connected to ground when the conventional output voltage of + 5 V (= logical "1") is applied to the output (1) of the threshold switch $IC_{52}$ via a grounded output (4). On the other hand, if the sensor is defective, if there is a power outage or if a cable is broken or the like the respective output (1, 9, 11–15) is not connected to ground when activated by the oscillator $IC_2$ which in this case has a voltage of 0 V (= logical "0") at the output of the threshold switch $IC_{52}$.

The outputs (1, 9, 11–15) of the ground switch $IC_7$ are connected respectively with one input of a keyboard 43 which is only shown schematically in FIG. 4. According to FIG. 6, each of these inputs leads, via a touch contact switch TS 1 to TS 7, to the cathode of a monitor device 44, e.g. a light diode, connected to the operating voltage by its anode. When one of the touch contact switches TS 1 to TS 7 is pressed, the cathode of the monitor device 44 is connected via this touch contact switch with the respective output of the ground switch $IC_7$. The monitor device 44 would therefore have to respond, e.g. light up, in the clock time determined by the interrogation frequency of the oscillator $IC_2$ whenever the output of the ground switch $IC_7$ associated with the actuated touch contact switch was activated. On the other hand, if the monitor device 44 does not react, there is a defect since the respective output of the ground switch $IC_7$ is not connected to ground periodically.

On the whole, the alarm and/or safety device 20 and the testing device with its associated display device 39 accordingly bring about the advantage that functioning can be monitored constantly during the operation of the total system.

Figure 7:
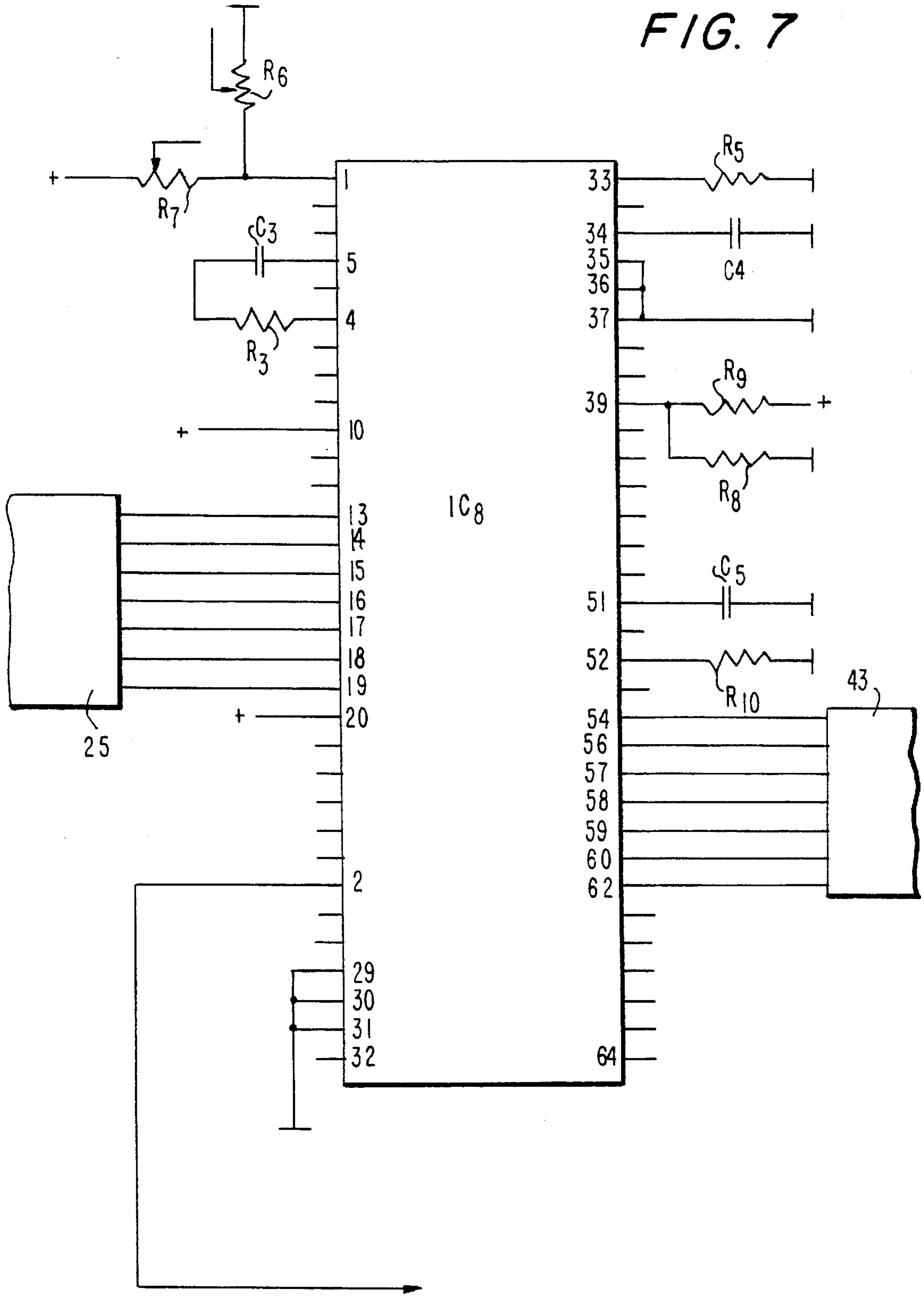
FIG. 7 shows a standardized plug-in card for the status-reporting device according to the invention which is adaptable to different sensors.

FIG. 7 shows a particularly preferred embodiment form of the status-reporting device according to the invention. It includes a standardized plug-in card or plate which is soldered to an integrated-circuit base and on which all integrated-circuit modules, cables and circuits are securely mounted with the exception of those parts which can be changed individually. In the embodiment example the integrated-circuit modules $IC_2$ to $IC_4$, $IC_{51}$ and $IC_{52}$, $IC_6$ and $IC_7$ are combined to form an individual integrated-circuit module $IC_8$ having inputs (1, 4, 5, 33, 34, 39, 51, 52) for the connection of resistors $R_3$ and $R_5$ to $R_{10}$ and capacitors $C_3$ to $C_5$, additional inputs (10, 20, 35–37) for the connection of the operating voltages or the ground, as well as additional inputs (13–19) for the connection of the transmitter unit 25 and outputs (54–62) for the connection of the keyboard 43 or the like and an output (2) for sending the warning signal occurring at the output (7) of the threshold switch $IC_{51}$ or the signal occurring at the output (10) of the monoflop $IC_6$. This provides the substantial advantage that the integrated-circuit module $IC_8$ can be used for a great number of different status-reporting and monitoring tasks and can be combined with transmitter units and keyboards or other display devices which are optional per se. It is only necessary to adapt some external switching members, shown in FIG. 7, depending on the sensors and display devices used in individual cases.

In addition, the integrated-circuit module $IC_8$ shown in FIG. 7 is preferably cast with the described sealing compound for the temperature sensors and subsequently cured for 16 hours at 80° C. and 3 hours at 120° C. The process can then be continued in the same manner as in the curing of the temperature sensor. Due to the universal construction of such a module it is possible to execute a great number of monitoring tasks with virtually identical means and by an optimized device occupying little space.

The invention is not limited to the described embodiment examples which can be modified in different ways. This is true particularly for the utilized temperature sensors, for which other temperature sensors and sensors for entirely different purposes, e.g. cold conductors, wire strain gauges, infrared and other light sensors, voltmeters or the like, can be substituted. It is only necessary to reshape the particular measurement signals into signals which are usable for the described electric circuits and to adapt them in a corresponding manner to the thresholds adjusted at the threshold switches $IC_{51}$ and $IC_{52}$. Further, it goes without saying that other alarm and/or safety devices as well as other display devices can be provided, their construction depending to a great extent on the type of states that are monitored. Naturally, acoustic indicators or other kinds of indicators can be provided instead of optical displays. Further, the number of sensors can be more than or less than the described seven sensors. Of course, it is also possible to apply different types of sensors or sensors for monitoring different types of states to the described circuit, particularly the integrated-circuit module $IC_8$ according to FIG. 7. It would only be necessary to adapt their output signals in a corresponding manner. Finally, the invention is not limited to the use of the specifically indicated integrated-circuit modules which were only included by way of example.

I claim:

1. Status-reporting device for reporting a predetermined temperature state comprising a plurality of temperature sensors ($Rs_1$–$Rs_7$) producing output signals according to a temperature state monitored by the sensors, and an evaluating device connected to the sensors and having means for generating and transmitting an alarm signal when a preselected value the output signals is reached, said evaluating device comprising an interrogating device ($IC_3$) having an output (3) and a plurality of inputs (1, 2, 5, 12–15) for said sensors ($Rs_1$–$Rs_7$), means ($IC_2$) for connecting the sensors and the inputs (1, 2, 5, 12–15) of the interrogating device ($IC_3$) with the output (3) of the interrogating device ($IC_3$) periodically and one after the other, said means ($IC_2$) being coupled with said interrogating device, and a threshold switch ($IC_{51}$) having an output (7) being connected to said means for generating and transmitting said alarm signal and connected with the output (3) of said interrogating device, wherein each of said temperature sensors ($Rs_1$ –$Rs_7$) is a bead-heat conductor (1) provided with a tip (3) carrying a semiconductor bead (4) and arranged in a housing (6), said housing (6) having a hollow end portion (8) and a protective cap (12) connected to said hollow end portion (8) so that said tip 3 is arranged within said protective cap (12), said protective car (12) is provided with at least one opening for maintaining a flow of air around said tip (3) and said bead-heat conductor (1) in said housing (6) is embedded in a casting compound (11) in such a way that only said tip (3)

projects out of said casting compound (11).

2. Status-reporting device according to claim 1, wherein said evaluating device further comprises a monoflop ($IC_6$) for temporarily storing the alarm signal and wherein the output (7) of the threshold switch ($IC_{51}$) is connected with the monoflop ($IC_6$) and monoflop ($IC_6$) has an output (10).

3. Status-reporting device according to claim 2, further comprising an alarm and safety device (20) and a power switch ($T_1$), said power switch ($T_1$) being connected to said alarm and safety device (20) and having a control input (2), and wherein the output (10) of the monoflop ($IC_6$) is connected with the control input (2) of the power switch ($T_1$).

4. Status-reporting device according to claim 3, wherein said alarm and safety device (20) contains an extinguishing device (22) and means for triggering the extinguishing device (22) when the alarm signal is received by said alarm and safety device (20).

5. Status-reporting device according to claim 3, wherein said alarm signal has a duration and said alarm and safety device (20) contains a warning device ($L_1$) including means for warning for the duration of the alarm signal and a further warning device ($L_2$) responsive to the alarm signal.

6. Status-reporting device according to claim 3, wherein said alarm and safety device (20) includes a testing device (41, $L_3$, $L_4$) including means for checking operation of said alarm and safety device (20).

7. Status-reporting device according to claim 6, further comprising a further testing device including means for checking proper functioning of the evaluating device and means for responding to improper functioning of the evaluating device and means for sending an additional alarm signal when said improper functioning is detected and wherein said further testing device is connected with the sensors ($Rs_1$–$Rs_7$) in parallel with the evaluating device.

8. Status-reporting device according to claim 7, wherein the further testing device includes an additional threshold switch ($IC_{52}$) comprising means for transmitting the additional alarm signal; an additional interrogating device ($IC_4$) having an output and a plurality of inputs (1, 2, 4, 5, 112, 13, 15) and wherein said inputs of said additional interrogating device are connected to each sensor ($Rs_1$–$Rs_7$) respectively and said output of said additional interrogating device is connected said additional threshold switch and means ($IC_2$) for connecting the sensors and the inputs (1, 2, 4, 5, 12, 13, 15) with the output of the additional interrogating device periodically and one after the other.

9. Status-reporting device according to claim 8, further comprising a display device (39) and wherein the additional threshold switch ($IC_{52}$) has an output (1) and the output (1) of the additional threshold switch is connected to the display device (39).

10. Status-reporting device according to claim 9, wherein the display device (39) contains a keyboard (43) including keys and at least one monitor device (44) for testing each of the sensors ($Rs_1$– $Rs_7$) individually by actuating the keys of the keyboard (43).

11. Status-reporting device for reporting a predetermined temperature state comprising a plurality of temperature sensors ($Rs_1$–$Rs_7$) producing output signals whose values depend on a temperature status monitored by the sensors, and an evaluating device connected to the sensors and including means for transmitting an alarm signal when a preselected value of the output signals is reached, a threshold switch ($IC_{51}$) for producing the alarm signal and having an output (7); an interrogation device having an output (3) and a plurality of inputs (1, 2, 5, 12–15) for said sensors ($Rs_1$–$Rs_7$), the output (3) of the interrogation device being connected to the threshold switch ($IC_{51}$); and means ($IC_2$) for connecting the sensors and the inputs (1, 2, 5, 12–15) of the interrogation device ($IC_3$) with the output (3) of the interrogation device ($IC_3$) periodically and one after the other, wherein each of the temperature sensors ($Rs_1$–$Rs_7$) have a housing (6) and a bead-heat conductor provided with a tip (3) carrying a semiconductor bead (4) in the housing (6) and embedded in a casting compound (11) in such a way that said tip (3) carrying the semiconductor bead (4) projects out of the casting compound, the housing (6) includes a hollow end portion (8) and a protective cap (12) connected with the hollow end portion (8), said protective cap being provided with at least one opening for maintaining a flow of air around the tip (3), and the casting compound (11) also partially fills the protective cap (12); and monoflop means ($IC_6$) for temporarily storing the alarm signal having an output and connected with the output (7) of the threshold switch ($IC_{51}$).

12. Status-reporting device according to claim 11, further comprising an alarm and safety device (20) and a power switch ($T_1$) having a control input (2) and connected to the alarm and safety device (20) and wherein the output of the monoflop means ($IC_6$) is connected with the control input (2) of the power switch ($T_1$).

13. Status-reporting device according to claim 12, wherein the alarm and safety device (20) includes an extinguishing device (22) and means for triggering the extinguishing device (22) by the alarm signal.

14. Status-reporting device according to claim 12, wherein the alarm and safety device (20) contains warning means ($L_1$) for warning for the duration of the alarm signal and additional warning means ($L_2$) permanently warning responsive to the alarm signal.

15. Status-reporting device according to claim 12, wherein the alarm and safety device (20) includes a testing device (41, $L_3$, $L_4$) for checking operation of the alarm and safety device (20).

16. Status-reporting device according to claim 11, further comprising a testing device for checking proper functioning of the evaluating device and for responding to improper functioning of the evaluating device and means for sending an additional alarm signal when said improper function is detected, and wherein said testing device is connected in parallel with the evaluating device.

17. Status-reporting device according to claim 16, wherein the testing device has an additional threshold switch for sending the additional alarm signal having an output (1) and an additional interrogating device ($IC_4$) having an output and a plurality of inputs (1, 2, 4, 5, 12, 13, 15), the inputs of the additional interrogating device being connected to each sensor ($Rs_1$– $Rs_7$) respectively and said output of said additional interrogating device being connected to the additional threshold device and means ($IC_2$) for connecting the sensors and the inputs (1, 2, 4, 5, 12, 13, 15) of the additional interrogating device with the output (3) of the additional interrogating device periodically and one after the other.

18. Status-reporting device according to claim 17, further comprising a display device (39) and wherein the output (1) of the additional threshold switch ($IC_{52}$) is connected to the display device (39).

19. Status-reporting device according to claim 18, wherein the display device (39) contains a keyboard (43) including keys and at least one monitor device (44) for testing the sensors ($Rs_1$–$Rs_7$) individually by actuating the keys of the keyboard (43).

20. Status-reporting device for reporting a predetermined temperature state, said status-reporting device comprising a plurality of temperature sensing means ($Rs_1$–$Rs_7$) for generating output signals whose values are characteristic of temperatures monitored by the sensing means, and evaluating means for receiving said output signals and for sending an alarm signal in response to said output signals when a preselected value of at least one of the output signals is reached, said evaluating means including a threshold switch ($IC_{51}$) for generating the alarm signal; an interrogation device ($IC_3$) having a plurality of inputs (1, 2, 5, 12– 15) connected to respective ones of said sensing means ($Rs_1$–$Rs_7$) and an output (3) connected to said threshold switch ($IC_{51}$) and means ($IC_2$) for connecting the sensors and the inputs (1, 2, 5, 12–15) of the interrogation device ($IC_3$) with the output (3) of the interrogation device ($IC_3$) periodically and one after the other; and testing means for checking for a proper functioning of the evaluating means and for responding to an improper functioning of the evaluating means and means for sending an additional alarm signal when the improper functioning is detected, said testing means being connected in parallel with the evaluating device and including an additional threshold switch ($IC_{52}$) for generating the additional alarm signal, an additional interrogating device ($IC_4$) having a plurality of inputs (1, 2, 4, 5, 12, 13, 15) connected to respective ones of said sensing means ($Rs_1$–$Rs_7$) and an output connected to the additional threshold switch ($IC_{52}$) and means ($IC_2$) for connecting the sensors and the inputs (1, 2, 4, 5, 12, 13, 15) of the additional interrogating device ($IC_4$) with the output (3) of the additional interrogating device ($IC_4$) periodically and one after the other, wherein the interrogating devices ($IC_3$, $IC_4$), the threshold switches ($IC_{51}$, $IC_{52}$), and the means ($IC_2$) are combined to form a standardized plug-in card ($IC_8$) having input connections including connections for heat conductors, adjusting members, display devices and operating voltages, and means for selecting and adjusting said heat conductors individually, and having at least one output (2) for transmitting the alarm signals generated by the evaluating means and wherein each of the temperature sensing means ($Rs_1$–$Rs_7$) includes a housing (6) and a bead-heat conductor comprising a tip (3) carrying a semiconductor bead (4) in the housing (6) embedded in a casting compound (11) in such a way that said tip (3) carrying the semiconductor bead (4) projects out of the casting compound, the housing (6) includes a hollow end portion (8) and a protective cap (12) connected with the hollow end portion (8) and provided with at least one opening for maintaining a flow of air around the tip (3), and the casting compound (11) also partially fills the protective cap (12).

21. Process for making a temperature sensor comprising a housing (6) having a base (9), a hollow end portion (8) remote from the base, said hollow end portion being at an open end of the housing, and a protective cap (12) on the open end of the housing, said protective cap being provided with at least one opening for maintaining a flow of air; plug-in connectors arranged within the housing (6) and a sensor element (1) in the form of a bead-heat conductor and having leads (5) and a tip (3) carrying a semiconductor bead (4), said sensor element (1) being arranged within said hollow end portion (8) so that said leads (5) are connected with the plug-in connectors and said tip (3) is arranged within said protective cap (12), wherein said hollow end portion (8) and partially also said protective cap (12) are filled by a casting compound (11) consisting of epoxy casting resin, said sensor element (1) being embedded in the casting compound (11) so that said tip (3) projects out of the casting compound (11), said process comprising the steps of:

a) providing the sensor element (1) with the leads connected to the plug-in connectors in the housing (6);

b) filling the hollow end portion and at least a part of the protective cap with a mixture of a sealing compound and a hardener in a mixture weight ratio of said sealing compound to said hardener of 10:1 to 10:1.1 so as to form the casting compound, said filling continuing until only the tip of the bead conductor carrying the heat conductor bead projects out of the casting compound;

c) heating the filled hollow end portion and the filled part of the protective cap of step d) at about 80° C. for about 16 hours, then heating at about 120° C. for about 3 hours and finally heating at about 180° C. for about 3 hours so as to cure the casting compound; and d) allowing the filled hollow end portion and the filled part of the protective cap heated in step e) to cool to room temperature so as to form the temperature sensor.

22. Process as defined in claim 21, wherein said sealing compound consists of Stycast 2762 FT and said hardener consists of catalyst 17.

23. Process as defined in claim 21, further comprising the step of preheating the hollow end portion of the housing and the protective cap to about 80° C.

24. Temperature sensor comprising: a housing (6) having a base (9), and a hollow end portion (8) remote from the base and at an open end-of the housing and a protective cap (12) on the open end of the housing, said protective cap being provided with at least one opening for maintaining a flow of air, plug-in connectors arranged in the housing (6) and a sensor element (1) in the form of a bead-heat conductor having a glass tube with a tip (3) enclosing a heat sensing bead (4), and with leads (5) fastened to said bead (4) and being guided out of said glass tube, said sensor element (1) being arranged within said hollow end portion (8) so that said leads (5) are connected with the plug-in connectors and said tip (3) being arranged within said protective cap (12), wherein said hollow end portion (8) and partially also said protective cap (12) are filled by a casting compound consisting of epoxy casting resin (11), said sensor element (1) being embedded in the casting compound so that said tip (3) projects out of the casting compound.

* * * * *

UNITED STATES PATENT AND TRADEMARK OFFICE

CERTIFICATE OF CORRECTION

PATENT NO. : 5 463 375

DATED : October 31, 1995

INVENTOR(S) : Heinz BAUER

It is certified that error appears in the above-indentified patent and that said Letters Patent is hereby corrected as shown below:

Column 10, line 47, between "value" and "the" insert --of--.

Column 10, line 64, delete "car" and substitute therefor --cap--.

Column 14, line 29, delete "step e)" and substitute therefor --step c)--.

Signed and Sealed this

Sixteenth Day of April, 1996

Attest:

Bruce Lehman

BRUCE LEHMAN

*Attesting Officer*

*Commissioner of Patents and Trademarks*